(12) United States Patent
Schwab et al.

(10) Patent No.: US 8,647,762 B2
(45) Date of Patent: Feb. 11, 2014

(54) BATTERY CELL MODULE

(75) Inventors: Leo F. Schwab, Fraser, MI (US); Andrew P. Oury, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 7 days.

(21) Appl. No.: 12/695,589

(22) Filed: Jan. 28, 2010

(65) Prior Publication Data

US 2011/0183176 A1 Jul. 28, 2011

(51) Int. Cl.
*H01M 2/10* (2006.01)

(52) U.S. Cl.
USPC ............. 429/99; 429/120; 429/148; 429/154; 429/159; 429/160; 206/703

(58) Field of Classification Search
USPC ............... 429/53–56, 96–100, 120, 121, 123, 429/148–160; 206/703–705
See application file for complete search history.

(56) References Cited

U.S. PATENT DOCUMENTS

| | | | | |
|---|---|---|---|---|
| 6,068,946 | A * | 5/2000 | Zedell et al. | 429/100 |
| 2005/0202311 | A1* | 9/2005 | Higashino et al. | 429/99 |
| 2009/0162741 | A1* | 6/2009 | Zheng et al. | 429/99 |
| 2009/0325043 | A1* | 12/2009 | Yoon et al. | 429/90 |
| 2010/0248000 | A1* | 9/2010 | Damsohn et al. | 429/120 |
| 2011/0027630 | A1* | 2/2011 | Tsutsumi et al. | 429/53 |

FOREIGN PATENT DOCUMENTS

| | | | | |
|---|---|---|---|---|
| CN | 201262974 Y | * | 6/2009 | |
| CN | 101490871 A | | 7/2009 | |
| DE | 102007050518 A1 | * | 4/2009 | ............ H01M 10/50 |
| KR | 2007110565 A | * | 11/2007 | |
| WO | WO 2009125544 A1 | * | 10/2009 | |

OTHER PUBLICATIONS

Translation of CN 201262974 Y.*

* cited by examiner

*Primary Examiner* — Raymond Alejandro
*Assistant Examiner* — Helen McDermott
(74) *Attorney, Agent, or Firm* — Fraser Clemens Martin & Miller LLC; J. Douglas Miller

(57) ABSTRACT

A battery cell module includes an enclosure having an electrically non-conductive perimeter and at least one cover formed from a thermally conductive material. The cover has a substantially flat inner surface and sealingly engages the electrically non-conductive perimeter. A plurality of series-interconnected battery cells are placed together into facing contact with each other, an exterior one of the battery cells in facing contact with the inner surface of the cover to facilitate heat transfer therethrough and to provide a desired compression against the series-interconnected battery cells. A first end of the series-interconnected battery cells includes a positive terminal end, and a second end of the series-interconnected battery cells including a negative terminal end, the series-interconnected battery cells the positive and negative terminal ends extending through the electrically non-conductive perimeter.

18 Claims, 3 Drawing Sheets

BATTERY CELL MODULE

FIELD OF THE INVENTION

The present disclosure relates to a packaging for a battery pack and more particularly to a battery cell module assembly.

BACKGROUND OF THE INVENTION

A battery cell has been proposed as a clean, efficient and environmentally responsible power source for electric vehicles and various other applications. One type of battery cell is known as the lithium-ion battery. The lithium-ion battery is rechargeable and can be formed into a wide variety of shapes and sizes so as to efficiently fill available space in electric vehicles. A plurality of individual lithium-ion battery cells can be provided in a battery cell module to provide an amount of power sufficient to operate electric vehicles. Typically, in order to provide a high power density in an efficient package, a large number of battery cells (often much greater than 10) are packaged within an individual battery cell module.

Lithium-ion batteries are known to generate heat during operation and as a result of a charge cycle when recharging. When overheated or otherwise exposed to high-temperature environments, undesirable effects can impact the operation of lithium-ion batteries. Active cooling systems are typically employed with lithium-ion battery packs to militate against the undesirable overheating conditions. The active cooling systems typically involve flow channels or ribs on a cooling fin interposed between adjacent battery cells, both of which lead to non-uniform pressure applied to the external surfaces of individual battery cells. Further, the active cooling system undesirably increases the complexity of battery packs and the installation thereof by increasing the required packaging space and decreasing a volumetric efficiency. Additionally, significant temperature variations still may occur between individual battery cells within the same battery pack due to uneven cooling, further impacting the battery cell module operation.

Moreover, as lithium-ion battery cells charge and are discharged, they may expand, and they may expel gases as a byproduct of the chemical reaction occurring therein. It is desirable to contain the expansion of the cells, and the resultant internal pressures generated within a battery cell module due to the expansion of battery cells. It is further desirable to contain the by-product gases, and to either capture or properly exhaust the gases from the battery cell module.

There is a continuing need for an easily manufacturable battery cell module having an integral cooling system and method for maintaining a desired temperature and power density of a battery pack such as a lithium-ion battery pack. Desirably, the battery cell module and method provides a uniformly distributed surface pressure to the battery pack, while maintaining effective heat transfer therefrom and allowing the containment or capture of any expelled gases generated within the cell.

SUMMARY OF THE INVENTION

In concordance with the instant disclosure, an easily manufacturable battery cell module having an integral cooling system and method for maintaining a desired temperature and power density of a battery pack such as a lithium-ion battery pack, and providing a uniformly distributed surface pressure to the battery pack while maintaining effective heat transfer therefrom, and further enabling the containment or capture of any expelled gases from the battery pack, is surprisingly discovered.

According to the invention, a battery cell module is disclosed comprising a perimeter frame and at least one cover formed from a thermally conductive material, the cover having a substantially flat inner surface and sealingly engaging the perimeter frame. A plurality of series-interconnected battery cells are arranged into facing contact with each other, a first end of the battery cells including a positive terminal end and a second end of the battery cells including a negative terminal end, each extending through the perimeter frame. At least one of the battery cells is arranged in facing contact with the inner surface of the cover to facilitate heat transfer therethrough, the positive and negative terminal ends.

In one embodiment, the enclosure is generally parallelepiped shaped, having a top, a bottom, a first side, and a second side, and first and second opposing covers formed from a thermally conductive material, the opposing covers having substantially flat inner surfaces and sealingly engaging the top, the bottom, the first side and the second side. A plurality of series-interconnected battery cells are arranged into facing contact to define interior battery cells in facing contact with adjacent battery cells and exterior battery cells in facing contact with one battery cell and with a substantially flat inner surface to facilitate heat transfer therethrough. A first end of the series-interconnected battery cells includes a positive terminal end, and a second end of the series-interconnected battery cells including a negative terminal end, wherein the positive and negative terminal ends extend through at least one of the top, the bottom, the first side and the second side of the exterior frame. One of the top, the bottom, the first side and the second side of the exterior frame may further include a vent port and an opening for a temperature monitoring probe. An outer surface of the opposing covers may be finned to facilitate heat transfer to the external environment for cooling of the module.

In another embodiment, an electrical interconnection between adjacent ones of the series-interconnected battery cells further includes a conductive tab, wherein each of the tabs further extends through at least one of the top, the bottom, the first side and the second side of the exterior frame to facilitate a voltage monitoring of each of the cells.

In another embodiment, a thermally conductive plate is interposed substantially in the middle of the series-interconnected battery cells between and in facing contact with opposing faces of adjacent cells. The plate is in thermal communication with the inner surface of the opposing covers to facilitate heat transfer therethrough.

A method for assembling a battery cell module is also disclosed.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, are not necessary or critical.

Figure 1:
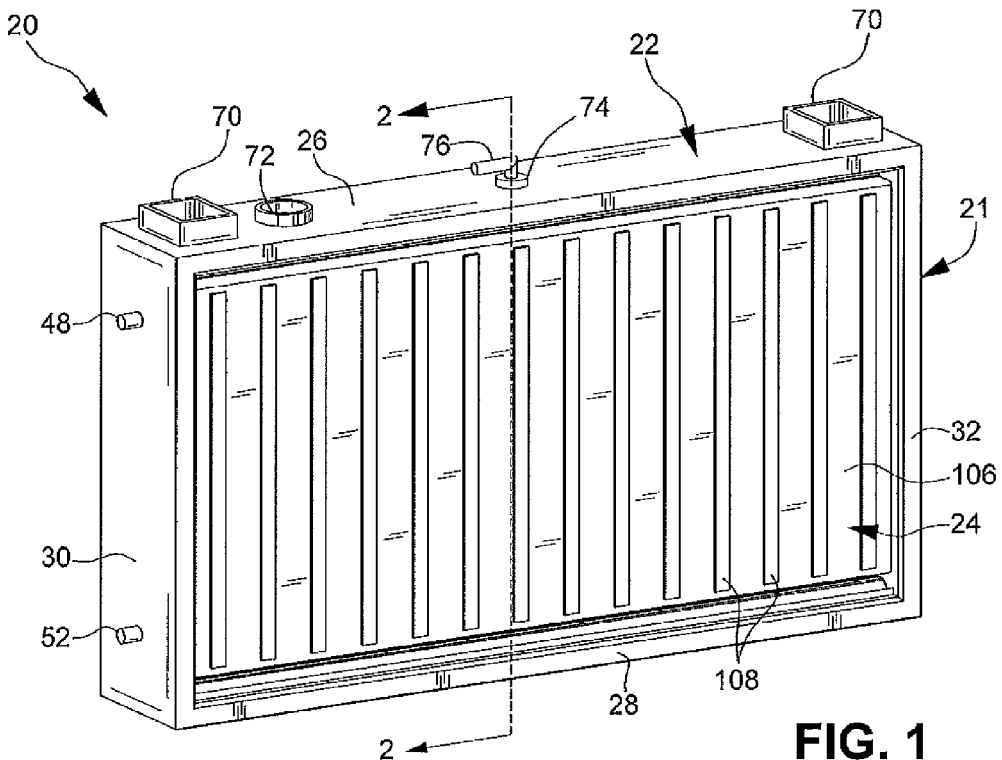
FIG. 1 is a perspective view of a battery cell module according to the present invention.
Figure 2:
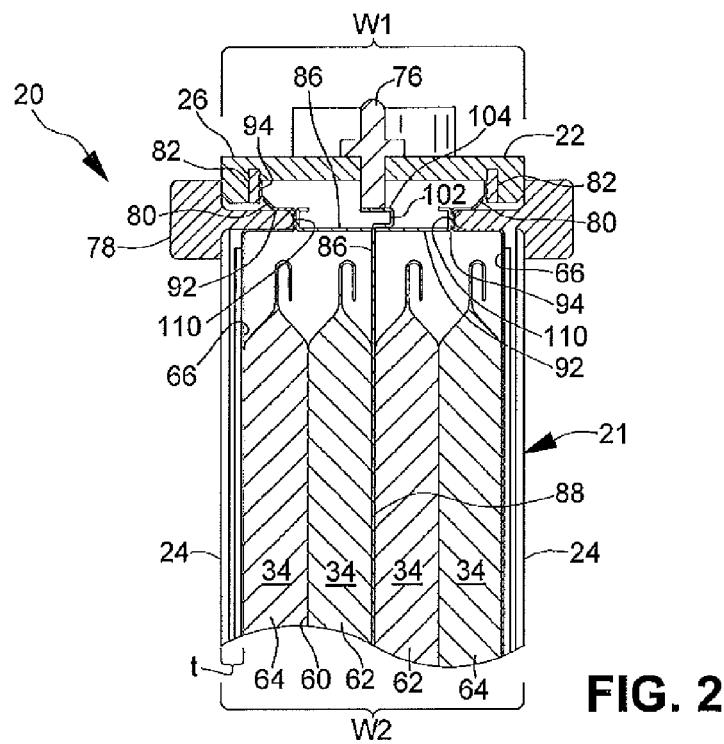
FIG. 2 is a fragmentary cross-sectional, side elevational view of the battery cell module taken along section line 2-2 in FIG. 1.
Figure 3:
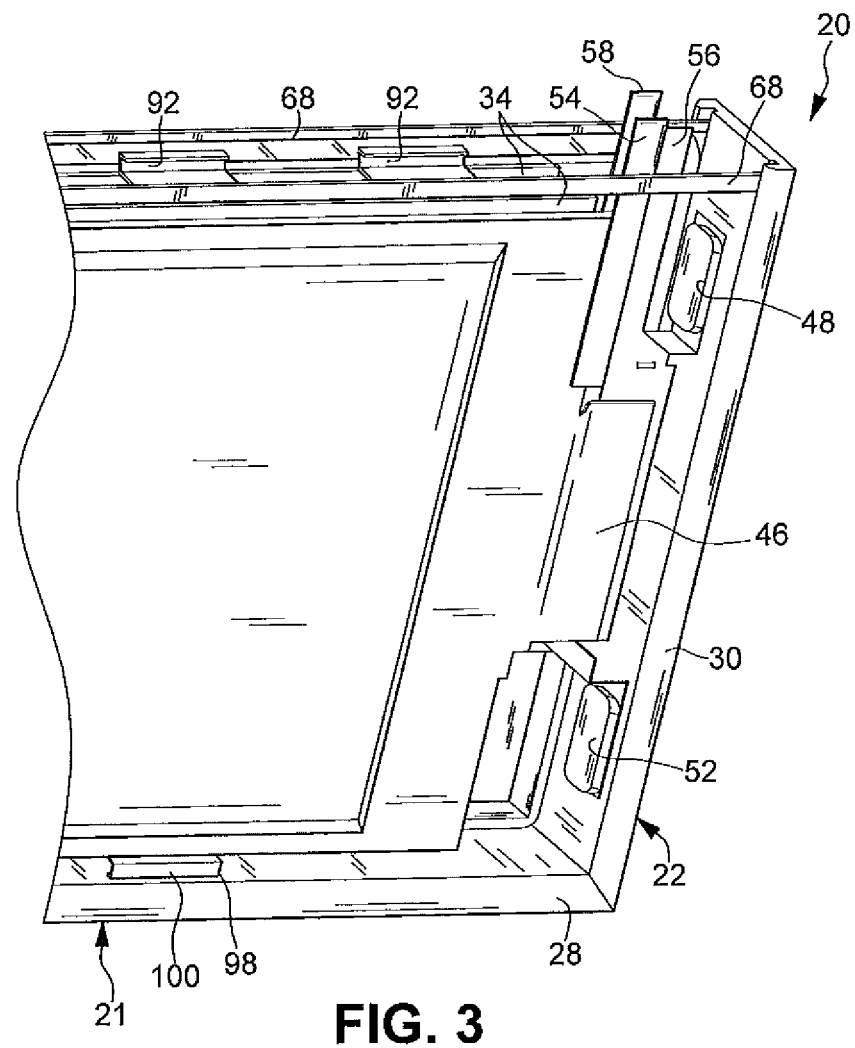
FIG. 3 is a fragmentary perspective view of the battery cell module according to FIG. 1 with a side cover thereof removed.

Referring to FIGS. 1-3, a battery cell module 20 according to the present invention is shown. The battery cell module 20 includes a perimeter frame 22 and opposed thermally conductive side covers 24. The battery cell module 20 shown in FIGS. 1-3 is represented as a parallelepiped having a top 26, a bottom 28, a first side 30 and a second side 32 cooperatively forming the perimeter frame 22, while the thermally conductive opposing side covers 24 cooperate therewith to form the battery cell module 20. It is understood that the battery cell module 20 may have any geometric shape to accommodate various battery types and shapes.

A plurality of battery cells 34 is disposed within the battery cell module 20. The plurality of battery cells 34 is a prismatic battery cell, and may be a prismatic lithium ion (Li-ion) battery cell. It should be appreciated that other battery cells 34, employing a different structure and electrochemistry, may also be used within the scope of the present invention.

Figure 4:
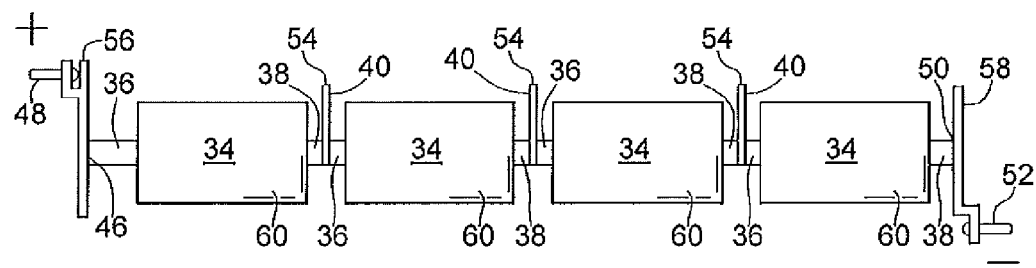
FIG. 4 is a schematic side elevational view of a plurality of battery cells prior to assembly as a battery cell module, according to FIGS. 1-3.

As shown in FIG. 4, each battery cell 34 includes a positive terminal end 36 and a negative terminal end 38. The battery cells 34 are arranged in series wherein a positive terminal end 36 is electrically connected to a negative terminal end 38 of an adjacent battery cell 34 via a weld tab 40, except for a positive end battery cell 42 and a negative end battery cell 44. As shown, the weld tabs 40 extend laterally from the battery cells 34, and further include voltage monitoring leads 54 that extend from the weld tab 40 and project through the top 26 of the perimeter frame 22 as illustrated in FIGS. 1 and 3. The electrical connections between positive terminal ends 36 and negative terminal ends 38 are conventionally formed, and may include welds or bolts as desired. Additionally, four series-interconnected battery cells 34 are shown in FIG. 4, but any number of battery cells 34 may be interconnected without departing from the invention.

The positive terminal end 46 of the positive end battery cell 42 is electrically connected to a positive terminal lead 48, while the negative terminal end 50 of the negative end battery cell 44 is electrically connected to a negative terminal lead 52. Additionally, the positive terminal lead 48 includes a laterally extending voltage monitoring lead 56, and the negative terminal lead 52 includes a laterally extending voltage monitoring lead 58. As shown, the voltage monitoring leads 56, 58 project through the top 26 of the perimeter frame 22

As shown in FIG. 3, the voltage monitoring leads 54, 56, 58 may be used in any combination to monitor the voltage of individual battery cells 34 within the battery cell module 20, or may be used to monitor the voltage of the entire battery cell module 20. It is understood that the voltage monitoring leads 54, 56, 58 may project in any direction. However, the voltage monitoring leads extend outwardly through the perimeter frame 22, and are electrically insulated from the perimeter frame 22, as is conventionally known.

Prior to insertion into the battery cell module 20, the battery cells 34 are assembled to place battery faces 60 in facing contact with each other. When assembled, the battery faces 60 provide support for adjacent battery cells 34, and allow efficient packaging of the battery cells 34 within the battery cell module 20. In one method, the battery cells 34 are electrically interconnected as described prior to being folded over to place the battery faces 60 in facing contact with each other. In another method, the battery cells 34 are first stacked to place the positive terminal end 36 of one battery cell 34 adjacent to a negative terminal end 38 of an adjacent battery cell 34. After stacking, the adjacent battery cells 34 are electrically interconnected via the weld tabs 40. By stacking the battery cells prior interconnection thereof, the weld tabs 40 are not subjected to stress during a subsequent folding step.

As illustrated in FIG. 2, when the battery cells 34 are prepared for insertion into the perimeter frame 22, the individual battery cells 34 may be described as one of interior battery cells 62 and exterior battery cells 64. Interior battery cells 62 do not have a face 60 in contact with an inner surface 66 of the thermally conductive side covers 24, while exterior battery cells 64 have at least one face 60 in facing contact with the inner surface 66 of the thermally conductive side covers 24. Favorable results have been obtained where the positive end battery cell 42 and the negative end battery cell 44 are also the exterior battery cells 64, but it is understood that this need not be the case. The battery cells 34 are inserted into the perimeter frame 22, and the thermally conductive side covers 24 are installed in facing contact with a face 60 of the exterior battery cells 64 to provide a desired substantially uniformly distributed compression force to the battery cells 34.

Favorable results have been obtained when the battery cells 34 are first installed within a frame member 68, as shown in FIG. 3. Thereafter, the top 26, the bottom 28, the first side 30 and the second side 32 are assembled over the frame member 68. The top 26, the bottom 28, the first side 30 and the second side 32 may be formed from any material. Favorable results have been obtained when the top 26, the bottom 28, the first side 30 and the second side 32 are injection molded. The compound utilized for the injection molding of the top 26, the bottom 28, the first side 30 and the second side 32 may be an electrically non-conductive compound to form an electrically non-conductive perimeter frame 22. Favorable results have also been obtained when the top 26, the bottom 28, the first side 30 and the second side 32 are constructed from a metal such as aluminum to improve the structural strength and the thermal conductivity of the perimeter frame 22.

As shown in FIG. 1, the positive terminal lead 48 and the negative terminal lead 52 project through the first side 30 to allow the battery cell module to be electrically connected to an external load. Additionally, the top 26 is installed around the voltage monitoring leads 54, 56, 58. Voltage monitoring ports 70 may be formed in the top 26. It is understood that if the perimeter frame 22 is constructed from an electrically conductive material such as aluminum, the positive terminal lead 48, the negative terminal lead 52, and the voltage monitoring leads 54, 56, 58 must be electrically isolated from the perimeter frame. However, if the perimeter frame 22 is formed from an electrically non-conductive material such as by injection molding, the positive terminal lead 48, the negative terminal lead 52 and the voltage monitoring leads 54, 56, 58 may extend directly through the non-conductive material that forms the perimeter frame 22.

A vent port 72 is formed in the top 26 to allow capture and proper exhaust of any gases formed within the battery cell module 20. A temperature monitoring port 74 is also formed in the top 26 for insertion of a temperature probe 76. It is understood that the voltage monitoring ports 70, the vent port 72, and the temperature monitoring port may be placed in any desired location on the perimeter 22.

After the perimeter frame 22 has been assembled in place about the battery cells 34, the thermally conductive side covers 24 are installed into facing contact with the exterior battery cells 64. The thermally conductive side covers 24 may be compressed or snapped into place by a movable tool 78 so that an outer perimeter 80 of each thermally conductive side cover 24 engages a molded seal 82 on the electrically non-conductive perimeter frame 22, cooperating therewith to form a fluid tight seal within the battery cell module 20 while at the same time providing thermal path for heat removal from the battery cell module 20 and providing a uniformly distributed compression preload to the battery cells 34. It is understood that other methods for sealably interconnecting the outer perimeter 80 of the side covers 24 to the molded seal 82 may be utilized, as desired.

A thickness t of the side covers 24 may be chosen to further withstand any increased load on the side cover 24 due to expansion of the battery cells 34 over the life cycle thereof. In particular, the thickness t may be chosen depending upon the position of the battery cell module 20 within a stack of a plurality of the battery cell modules 20 (not shown) and depending upon the material used for the side covers 24. For example, an aluminum side cover 24 that constitutes an end plate on a larger stack of battery cell modules 20 may have a thickness t of about 4 mm, while a side cover 24 in an interior location of a plurality of battery cell modules 20 may have a thickness t of about 0.3 mm.

An outer surface 84 of the thermally conductive side covers 24 may further include raised ribs 108 to enable passive or active heat dissipation from the battery cell module 20 and to provide structural stability to the side covers 24 when placed under load. The ribs 108 may be formed as fins to dissipate heat from the side covers 24. However, favorable results have been obtained wherein the ribs 108 cooperate with corresponding ribs on an adjacent side cover 24 on an adjacent battery cell module 20 to form flow paths through which coolant such as air may flow. The air may be actively or passively circulated through the flow paths formed by adjacent ribs 108.

Figure 5:
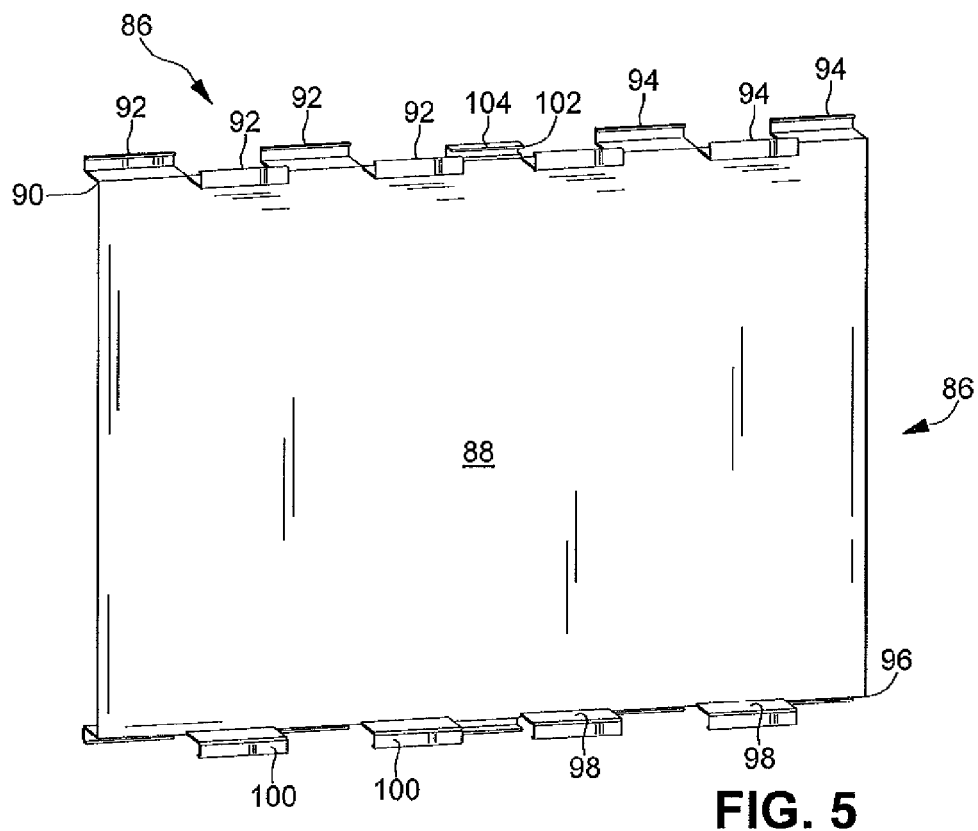
FIG. 5 is a side perspective view of a thermally conductive plate according to the embodiments shown in FIGS. 1-4.

Depending upon the size and storage capacity of the battery cells 34, additional cooling within the battery cell module 20 may be desired. In such instances, a thermally conductive plate 86 may be interposed in facing contact between interior battery cells 62. As best shown in FIGS. 2 and 5, the thermally conductive plate 86 includes substantially flat faces 88 sized to provide support to adjacent battery faces 60, while also providing a thermal pathway for heat removal from between the interior battery cells 62. A top edge 90 of the thermally conductive plate 86 is formed with alternating bent tabs 92, each of which terminates in a heat transfer pad 94. Similarly, a bottom edge 96 of the thermally conductive plate 86 is formed with alternating bent tabs 98, each of which terminates in a heat transfer pad 100. A center tab 102 is formed along the top edge 90 of the thermally conductive plate 86 having a heat transfer pad 104 on which the temperature probe 76 rests.

When the battery cell module 20 is assembled, the thermally conductive center plate 86 is interposed between adjacent interior battery cells 62. The alternating bent tabs 92, 98 extend in a direction away from the thermally conductive plate 86 towards a perimeter portion 110 of the inner surface 66 of the thermally conductive side covers 24. The heat transfer pads 94, 100 contact the perimeter portion 110 of the inner surfaces 66 of the thermally conductive side covers 24, thereby providing a heat transfer path from between the battery cells 34 to the thermally conductive side covers 24. The thermally conductive side covers 24 may have sufficient heat capacity to receive and store substantially all of the heat generated within the battery cell module 20. Additionally, an outer surface 106 (FIG. 1) of the side covers 24 may include ribs 108 for dissipating heat stored within the side covers 24 to an external environment. It is understood that the heat transfer from the outer surface 106 of the side covers 24 may occur through active or passive systems, and may involve conduction, convection or a combination thereof. Further, it is understood that inclusion of the thermally conductive center plate 86 is optional, depending upon the heat dissipation requirements of the battery cell module 20. By way of example, groups of three battery cells 34 within the battery cell module 20 may not require additional cooling, while favorable results have been observed when at least one thermally conductive plate 86 is included with four or more battery cells 34 grouped within the battery cell module 20.

The battery cell module 20 of the present invention is an easily manufacturable enclosure that includes an integral heat transfer path from the interior of the battery cell module 20 to the outer surface 106 of the thermally conductive side covers 24. The heat transfer path is assured as a result of the side covers 24 being installed to provide the substantially uniformly distributed surface pressure to the battery cells 34. A temperature probe 76 inserted through the top 26 of the battery cell module 20 contacts a heat transfer pad 104 that is thermally connected to the thermally conductive plate 86 within the battery cells 34, thereby allowing for the temperature within the battery cell module 20 to be continuously monitored. A voltage of each battery may be monitored through integrally provided voltage monitoring ports 70. Gases emitted are captured within the battery cell module 20, and may be removed through a vent port 72. The positive terminal lead 48 and the negative terminal lead 52 enable interconnection of any number of battery cell modules 20, and for correspondingly easy handling and replacement of any of the modules to achieve a desired power density. Individual battery cell modules 20 may be easily sized for various applications, including for advanced electric and hybrid vehicles.

While certain representative embodiments and details have been shown for purposes of illustrating the invention, it will be apparent to those skilled in the art that various changes may be made without departing from the scope of the disclosure, which is further described in the following appended claims.

What is claimed is:

1. A battery cell module, comprising:
   a perimeter frame having a main body with a first opening formed in a first side of the main body and a second opening formed in a second side of the main body, the first side of the main body disposed opposite the second side of the main body, the main body having a first flange and a second flange, the first flange extending inwardly from the main body toward the first opening on the first side of the main body, and the second flange extending inwardly from the main body toward the second opening on the second side of the main body;
   a plurality of series-interconnected battery cells contained within the perimeter frame, a first end of the battery cells including a positive terminal end and a second end of the battery cells including a negative terminal end, the battery cells arranged into facing contact with each other, a first exterior face of one of the plurality of battery cells disposed adjacent the first opening, and a second exterior face of one of the plurality of battery cells disposed adjacent the second opening, the positive and negative terminal ends extending through the perimeter frame; and a first side cover disposed within the first opening of the perimeter frame and abutting the first exterior face of the battery cells, and a second side cover disposed within the second opening of the perimeter frame and abutting the second exterior face of the battery cells, the first side cover and the second side cover each being thermally conductive and each having a substantially flat inner surface and an outer perimeter, the outer perimeter of the first side cover deformed inwardly toward the second side and cooperating with the first flange to engage a first molded seal and the outer perimeter of the second side cover deformed inwardly toward the first side and cooperating with the second flange to engage a second molded seal, to form a fluid tight seal within the battery cell module and to retain the battery cells between the first side cover and the second side cover with a uniformly distributed compressive preload.

2. The battery cell module of claim 1, further comprising a thermally conductive plate interposed between two of the battery cells, the plate in thermal communication with one of the opposing first and second side covers to facilitate heat removal from between the battery cells.

3. The battery cell module of claim 2, wherein an outer surface of the opposing first and second side covers includes ribs to facilitate heat dissipation.

4. The battery cell module of claim 3, wherein the ribs define a coolant flow path.

5. The battery cell module of claim 2, wherein an electrical interconnection between adjacent ones of the battery cells further includes a conductive tab extending through the perimeter frame to facilitate voltage monitoring of the battery cells.

6. The battery cell module of claim 5, wherein the conductive tab extends through a voltage monitoring port formed in the perimeter frame.

7. The battery cell module of claim 6, wherein the perimeter frame further includes a temperature monitoring port, a temperature probe inserted into the temperature monitoring port in thermal communication with the thermally conductive plate to monitor a temperature within the module.

8. The battery cell module of claim 1, wherein the perimeter frame is injected molded from an electronically non-conductive material.

9. The battery cell module of claim 1, wherein the perimeter frame further includes a vent port to facilitate capture and exhaust of gasses formed within the module.

10. The battery cell module of claim 1, wherein the deformed outer perimeter of the first side cover includes a first portion bent out of plane with a major portion of the first side cover and toward the second side of the perimeter frame, a second portion bent out of plane with the first portion, a third portion bent out of plane with the second portion and toward the first side of the perimeter frame, and a fourth portion bent out of plane with the third portion and toward the first flange of the perimeter frame.

11. A battery cell module, comprising:

a generally parallelepiped exterior frame having a main body with a top, a bottom, a first side, and a second side, a first opening formed in the first side of the main body and a second opening formed in the second side of the main body, the first side of the main body disposed opposite the second side of the main body, the main body having a first flange and a second flange, the first flange extending inwardly from the main body toward the first opening on the first side of the main body, and the second flange extending inwardly from the main body toward the second opening on the second side of the main body;

a plurality of series-interconnected battery cells contained within the exterior frame, a first end of the battery cells including a positive terminal end, a second end of the battery cells including a negative terminal end, the battery cells arranged into facing contact with each other to define interior battery cells each in facing contact with two adjacent battery cells and two exterior battery cells each in facing contact with one battery cell, a first exterior face of one of the exterior battery cells disposed adjacent the first opening, and a second exterior face of the other of the exterior battery cells disposed adjacent the second opening, the positive and negative terminal ends extending through the exterior frame; and a first side cover disposed within the first opening of the exterior frame and abutting the first exterior face of the battery cells, and a second side cover disposed within the second opening of the perimeter frame and abutting the second exterior face of the battery cells, the first side cover and the second side cover each being thermally conductive and each having a substantially flat inner surface and outer perimeter, the outer perimeter of the first side cover deformed inwardly toward the second side and cooperating with the first flange to engage a first molded seal and the outer perimeter of the second side cover deformed inwardly toward the first side and cooperating with the second flange to engage a second molded seal, to form a fluid tight seal within the battery cell module and to retain the battery cells between the first side cover and the second side cover with a uniformly distributed compressive preload.

12. The battery cell module of claim 11, further comprising a thermally conductive plate interposed between at least two interior battery cells, the plate in thermal communication with the inner surface of one of the first and second side covers to facilitate heat removal from between the interior battery cells.

13. The battery cell module of claim 12, wherein there are four battery cells.

14. The battery cell module of claim 12, wherein an electrical interconnection between adjacent ones of the battery cells further includes a conductive tab extending through at least one of the top, the bottom, a first end and a second end of the exterior frame to facilitate voltage monitoring of the battery cells.

15. The battery cell module of claim 14, wherein the conductive tab extends through a voltage monitoring port formed in one of the top, the bottom, the first end and the second end of the exterior frame.

16. The battery cell module of claim 12, wherein one of the top, the bottom, a first end and a second end further includes a temperature monitoring port, a temperature probe inserted into the temperature monitoring port in thermal communication with the thermally conductive plate to monitor a temperature within the module.

17. The battery cell module of claim 16, wherein at least one of the top, the bottom, the first end and the second end further includes a vent port to facilitate capture and exhaust of gases formed within the module.

18. The battery cell module of claim 12, wherein the top, the bottom, a first end and a second end are injection molded from an electrically non-conductive material.

* * * * *